(12) United States Patent  
Berney-Dale et al.

(10) Patent No.: US 12,270,667 B2  
(45) Date of Patent: Apr. 8, 2025

(54) DISTRIBUTED CONTROL SYSTEM FOR PREDICTIVE ROUTE ENERGY ESTIMATION

(71) Applicant: JAGUAR LAND ROVER LIMITED, Coventry (GB)

(72) Inventors: Graham Berney-Dale, Coventry (GB); Andrew Bradley, Coventry (GB); Nigel Johnson, Coventry (GB); Viorel Radu, Coventry (GB); Simon Hegarty, Coventry (GB); Matthew Hancock, Coventry (GB); Minsuk Shin, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 221 days.

(21) Appl. No.: 17/997,820

(22) PCT Filed: May 5, 2021

(86) PCT No.: PCT/EP2021/061896  
§ 371 (c)(1),  
(2) Date: Nov. 2, 2022

(87) PCT Pub. No.: WO2021/224343  
PCT Pub. Date: Nov. 11, 2021

(65) Prior Publication Data  
US 2023/0152110 A1   May 18, 2023

(30) Foreign Application Priority Data  
May 6, 2020 (GB) ...................... 2006713

(51) Int. Cl.  
*G01C 21/34* (2006.01)  
*B60L 58/13* (2019.01)  
*G01C 21/36* (2006.01)

(52) U.S. Cl.  
CPC .......... *G01C 21/3469* (2013.01); *B60L 58/13* (2019.02); *G01C 21/3682* (2013.01);  
(Continued)

(58) Field of Classification Search  
CPC ............ G01C 21/3469; G01C 21/3682; G01C 21/3694; G01C 21/3679; B60L 58/12;  
(Continued)

(56) References Cited

U.S. PATENT DOCUMENTS 9,834,197 B2 *  12/2017  Hirano ................. B60L 58/13  
2015/0066271 A1   3/2015  Ogawa  
2016/0185339 A1   6/2016  Ogawa

OTHER PUBLICATIONS

"Riemann sum," Wikipedia Website, Available Online at https://en.wikipedia.org/wiki/Riemann_sum, Page Created Jan. 30, 2003, 10 pages.  
(Continued)

*Primary Examiner* — Hai H Huynh  
(74) *Attorney, Agent, or Firm* — McCoy Russell LLP

(57) ABSTRACT

A control system is arranged to: receive energy information for a vehicle; divide route data into a plurality of route segments comprising first and second route segments; wherein each route segment is indicative of a portion of the route, a first route segment precedes a second route segment along the route, and the length of the first portion is smaller than the length of the second portion of the route; determine an energy requirement for each route segment in dependence on the energy information; and output the energy requirement for the plurality of route segments.

14 Claims, 7 Drawing Sheets

(52) U.S. Cl.
CPC .... *G01C 21/3694* (2013.01); *B60L 2240/642* (2013.01); *B60L 2240/66* (2013.01); *B60L 2240/68* (2013.01); *B60L 2250/16* (2013.01); *B60L 2260/52* (2013.01)

(58) Field of Classification Search
CPC .............. B60L 58/13; B60L 2240/642; B60L 2240/66; B60L 2240/68; B60L 2250/16; B60L 2260/52; B60L 7/10; B60L 15/2045; Y02T 90/16; Y02T 10/64; Y02T 10/70; Y02T 10/72; B60W 20/13; B60W 50/14
USPC ........................................................ 701/123
See application file for complete search history.

(56) References Cited

OTHER PUBLICATIONS

Great Britain Intellectual Property Office, Combined Search and Examination Report under Sections 17 and 18(3) Issued in Application No. GB2006713.8, Mar. 8, 2021, 6 pages.

ISA European Patent Office, International Search Report and Written Opinion Issued in Application No. PCT/EP2021/061896, Aug. 23, 2021, WIPO, 17 pages.

Great Britain Intellectual Property Office, Examination Report under Section 18(3) Issued in Application No. GB2006713.8, Sep. 7, 2022, 4 pages.

\* cited by examiner

DISTRIBUTED CONTROL SYSTEM FOR PREDICTIVE ROUTE ENERGY ESTIMATION

CROSS REFERENCE TO RELATED APPLICATIONS

The present application is a U.S. National Phase of International Application No. PCT/EP2021/061896 entitled "DISTRIBUTED CONTROL SYSTEM FOR PREDICTIVE ROUTE ENERGY ESTIMATION," and filed on May 5, 2021. International Application No. PCT/EP2021/061896 claims priority to Great Britain Patent Application No. 2006713.8 filed on May 6, 2020. The entire contents of each of the above-listed applications are hereby incorporated by reference for all purposes.

TECHNICAL FIELD

The present disclosure relates to control systems for route data transfer, for example, route data transfer between control systems in a vehicle. Aspects of the invention relate to control systems for a vehicle, methods, systems, computer software and computer readable media, and a vehicle.

BACKGROUND

It is known to provide route data indicating, for example, a planned route to a destination, and metadata associated with the route such as an estimated travel time or estimated fuel consumption.

To calculate accurate metadata for an electric vehicle (EV) or hybrid vehicle route, including accurate State of Charge (SoC) of a battery upon arrival at a destination, generally there is communication between the system hosting the navigation application (e.g. hosting maps and route information) and the system hosting the energy supply control system. As electric/battery powered vehicles are currently developing, there is no legacy requirement for such communication. Therefore, a dedicated and direct link between the navigation application system and energy supply control system does not exist. Communication between these systems takes place over a low bandwidth network.

Problems can arise because route profile information is generally significant in data processing and/or storage requirements (i.e. large data files are involved) and takes a long time to transmit over a twisted pair network as is currently used. Hence, to perform metadata calculations, passing route profile data to the energy supply control system is not feasible and such metadata calculations are performed by the navigation application system, with the supporting battery/stored energy information transmitted over the low bandwidth network. However, the navigation application system generally has limited memory resources, and priority for these resources is allocated to user-facing application requirements rather than metadata calculations. Thus a choice is required between faster, less accurate calculations performed at the navigation application system, or slower, more accurate calculations performed at the energy supply control system. Slower, more accurate calculation also still may include estimations to be made which can lead to inaccuracies.

Another potential problem relates to data security in transmitting data between the navigation application system and the energy supply control system. Maintaining a low bandwidth connection between the navigation application system and the energy supply control system also helps maintain a secure connection, because there is no high bandwidth date route into the vehicle systems which may be vulnerable to hacking.

It is an aim of the present invention to address one or more of the disadvantages associated with the prior art.

SUMMARY OF THE INVENTION

Aspects and embodiments of the invention provide control systems, methods, systems, a vehicle and computer software.

According to an aspect of the present invention there is provided a control system for a vehicle, the control system comprising one or more controllers, the control system arranged to: receive energy information for the vehicle; divide route data, the route data indicative of a route between a first location and a second location, into a plurality of route segments comprising a first route segment and a second route segment; wherein: each route segment is indicative of a portion of the route, the first route segment is indicative of a length of a first portion of the route, the second route segment is indicative of a length of a second portion of the route, the first route segment precedes the second route segment along the route; and the length of the first portion of the route is smaller than the length of the second portion of the route; determine an energy requirement for each route segment in dependence on the energy information; and output the energy requirement for the plurality of route segments.

The one or more controllers may collectively comprise: at least one electronic processor having an electrical input for receiving the energy information for the vehicle; and at least one memory device electrically coupled to the at least one electronic processor and having instructions stored therein; and wherein the at least one electronic processor is arranged to access the at least one memory device and execute the instructions thereon so as to: divide the route data into the plurality of route segments comprising the first route segment and the second route segment; determine the energy requirement for each route segment in dependence on the energy information; and output the energy requirement for the plurality of route segments.

The control system may be arranged to: receive an energy parameter indicative of energy consumption or energy generation according to at least one route property; and calculate an energy required to move the vehicle along each route segment in dependence on the received energy parameter.

The energy parameter may comprise:
tractional energy required in a predetermined speed window;
energy required to ascend a predetermined gradient;
energy gained by descent of a predetermined gradient; and
an amount of regenerative energy a battery of the vehicle can accept.

The control system may be arranged to output a tractive energy required to move the vehicle along each route segment.

The control system may be arranged to calculate a tractive energy required to move the vehicle along each route segment in dependence on the received energy parameter.

The control system may be arranged to: determine a future energy status of the vehicle at the end of each of the route segments calculated in dependence on the route segments and an energy status of the vehicle, the future energy status comprising an indication of a state of charge of an energy storage means of the vehicle. Such energy storage means may comprise, for example, electrical energy storage means such as a battery or capacitor.

The control system may be arranged to determine the future energy status by receiving the calculated future energy status; or calculating the future energy status.

The control system may be arranged to: identify, in dependence on the future energy status of the vehicle at the end of each of the received route segments, and map data, one or more charge points each indicating a location at which the vehicle can recharge an energy storage means; and output an indication of the identified one or more charge points with respect to the route.

The control system may be arranged to divide the route data into a plurality of route segments by: dividing the route data into a plurality of equal length route fragments; grouping a first portion of the route fragments into the first route segment; and grouping a second portion of the route fragments into the second route segments; wherein the number of route fragments in the second portion is greater than the number of route fragments in the first portion.

The control system may be arranged to divide the route into a predetermined number of route fragments of a predetermined minimum segment length.

If the length of the route is less than a predetermined length, the control system may be arranged to assign a fragment superseding the one or more second route segments as an empty fragment.

The route data may comprise information indicative of at least one from a group comprising:
  elevation gain along the route;
  elevation loss along the route;
  distance along the route;
  average speed of the route segments;
  traffic conditions along the route;
  weather conditions along the route;
  time at which a point of the route is planned to be reached; and
  speed of travel along the route.

According to another aspect of the invention, there is provided a control system for a vehicle, the control system comprising one or more controllers, the control system arranged to: receive a plurality of route segments, each route segment indicative of a portion of route data representing a route between at least first and second locations, wherein one or more first route segments of the plurality of route segments are indicative of a first length of the route, one or more second route segments of the plurality of route segments are indicative of a second length of the route, the one or more first route segments precede the one or more second route segments along the route and the first length is smaller than the second length; calculate, from the received route segments and an energy status of a vehicle, a future energy status of the vehicle at the end of the received route segments; and output the future energy status.

The one or more controllers may collectively comprise: at least one electronic processor having an electrical input for receiving the plurality of route segments; and at least one memory device electrically coupled to the at least one electronic processor and having instructions stored therein; and wherein the at least one electronic processor is arranged to access the at least one memory device and execute the instructions thereon so as to: calculate, from the received route segments and the energy status of a vehicle, the future energy status of the vehicle at the end of the received route segments; and output the future energy status.

The future energy status may indicate one or more of: a state of charge of an energy storage means of the vehicle, the vehicle being an electric vehicle; and a distance to a predetermined minimum state of charge of the energy storage means of the vehicle.

The vehicle may be a hybrid electric vehicle or an electric vehicle.

The control system may be arranged to: output one or more energy parameters indicating energy consumption or energy generation according to a route property; and receive an amount of tractive energy required to move the vehicle along each route segment calculated in dependence on the one or more provided energy parameters.

The control system may be arranged to calculate the future energy status of the vehicle at the end of the received route segments, in dependence on: the amount of tractive energy required to move the vehicle along each route segment received from the further controller; and one or more of: a predicted energy requirement to power ancillary operations of the vehicle and motor losses of the vehicle. The predicted energy requirement to power ancillary operations of the vehicle may comprise one or more of time dependent ancillary operations; and distance dependent ancillary operations.

The control system may be arranged to: receive data indicating one or more charge points with respect to the route, the one or more charge points each indicating a location at which the vehicle can recharge a battery, and the data indicating one or more charge points with respect to the route determined in dependence on the future energy status of the vehicle and map data, and provide, to a vehicle output apparatus, an indication of the one or more charge point locations with respect to the route.

According to an aspect of the present invention there is provided a control system for a vehicle, the control system comprising one or more controllers, the control system arranged to divide route data, the route data indicative of a route between a first location and a second location, into a plurality of route segments comprising a first route segment and a second route segment; wherein: each route segment is indicative of a portion of the route, the first route segment is indicative of a length of a first portion of the route, the second route segment is indicative of a length of a second portion of the route, the first route segment precedes the second route segment along the route; and the length of the first portion of the route is smaller than the length of the second portion of the route; and output the plurality of route segments.

According to another aspect of the invention, there is provided a system for a vehicle, comprising a control system is disclosed herein.

According to another aspect of the invention, there is provided a vehicle comprising any control system, or system disclosed herein.

According to another aspect of the invention, there is provided a method comprising dividing route data indicative of a route between at least first and second locations into a plurality of route segments, wherein each of the route segments is indicative of a portion of the route, one or more first route segments of the plurality of route segments are indicative of a first length of the route, one or more second route segments of the plurality of route segments are indicative of a second length of the route, the one or more first route segments precede the one or more second route segments along the route and the first length is smaller than the second length; and outputting the route segments.

According to another aspect of the invention, there is provided a method comprising: receiving a plurality of route segments, each route segment indicative of a portion of route data representing a route between at least first and second locations, wherein one or more first route segments of the plurality of route segments are indicative of a first length of the route, one or more second route segments of the plurality of route segments are indicative of a second length of the route, the one or more first route segments precede the one or more second route segments along the route and the first length is smaller than the second length; calculating, from the received route segments and an energy status of a vehicle, a future energy status of the vehicle at the end of the received route segments; and outputting the future energy status.

According to another aspect of the invention, there is provided computer software which, when executed, is arranged to perform any method disclosed herein.

According to another aspect of the invention, there is provided a non-transitory, computer-readable storage medium storing instructions thereon that, when executed by one or more electronic processors, causes the one or more electronic processors to carry out any method disclosed herein.

Within the scope of this application it is expressly intended that the various aspects, embodiments, examples and alternatives set out in the preceding paragraphs, in the following description and/or drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
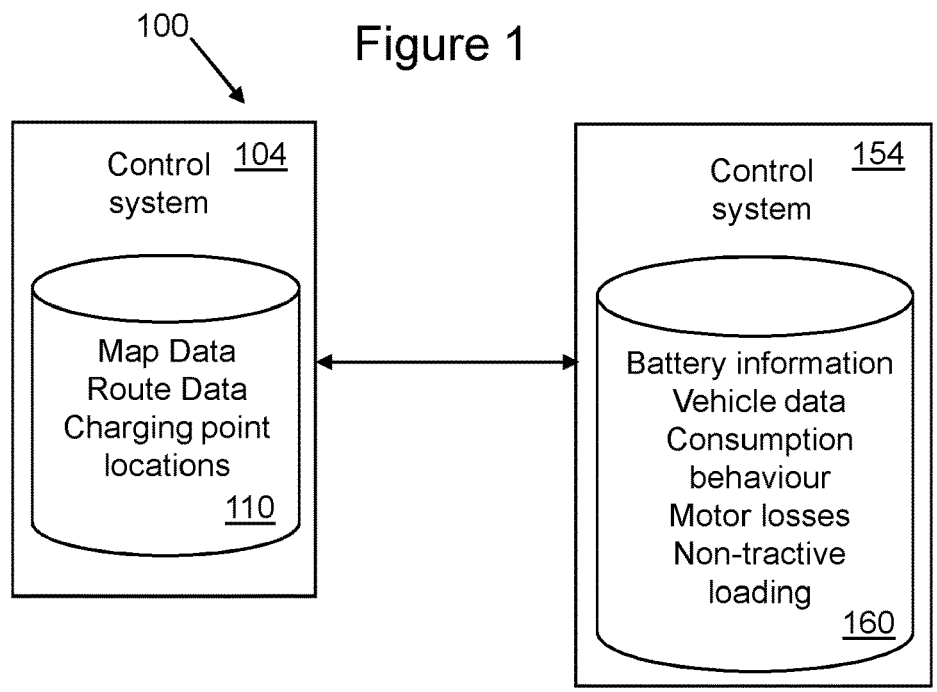
FIG. 1 shows examples of data managed in control systems of a vehicle according to examples disclosed herein.

Control systems 100 in accordance with an embodiment of the present invention are described herein with reference to FIG. 1, which shows examples of data managed in control systems 100 of a vehicle. The first control system 104 is an example navigation application system, which stores on a storage 110 and/or manages (e.g. stored on a storage in communication with the control system 104) data such as map data, route data, and charging point location data. The first control system 104 may be considered to handle navigation-related data.

The second control system 154 is an example energy storage control system, which stores on a storage 160 and/or manages (e.g. stored on a storage in communication with the control system 154) data such as battery information, vehicle data, consumption behaviour, motor losses, and non-tractive loading data. The second control system 154 may be considered to handle vehicle-related data and may control vehicle data for a current state of a vehicle.

To calculate route metadata, such as remaining energy stored for the vehicle at points along a route, or in some examples the route itself (e.g. including stopping points to recharge a battery of an electric vehicle), information handled by both the first and second control systems may be used. The energy stored in a battery may be termed the 'state of charge' of the battery. It will be appreciated by a person skilled in the art that the energy stored by a given amount of charge also depends on the voltage of the battery, and the voltage depends on the total amount of charge in the battery. Thus there is a non-linear relationship between the 'energy stored' and the 'state of charge' of the battery, since the voltage increases with the state of charge.

Figure 2:
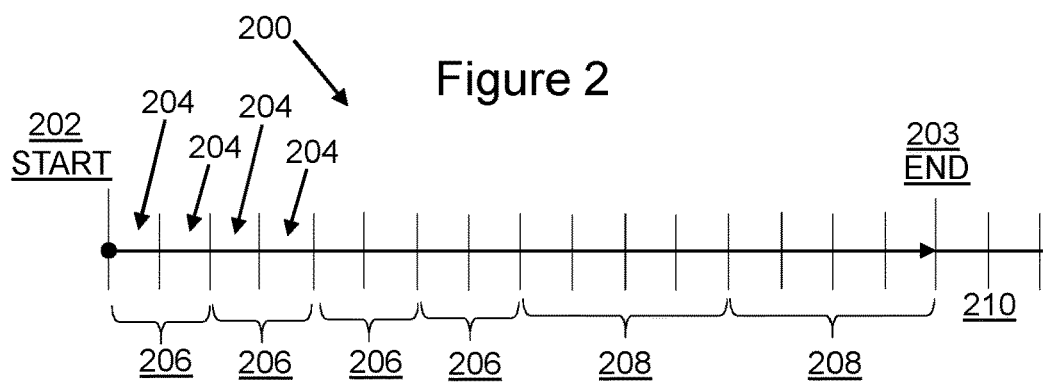
FIG. 2 shows an example of fragmented route data, and combination of those fragments to form segmented route data, according to examples disclosed herein.

FIG. 2 shows an example of segmented route data for a route 200 according to examples disclosed herein. A route 200 which is represented by route data is indicated, having a start point 202 and an end point 203. The route data may be considered to represent an eHorizon detailing the route to be taken. However, it is unrealistic to export such detailed route data to a control system which may struggle to handle such large size data and calculate energy requirements for the route, as well as existing communication links between route and vehicle control systems being unsuited (e.g. twisted pair connections) for large data transmissions. Therefore, an approximation of the route data may be used and exported to a vehicle system for energy calculations.

The route data may be divided into a plurality of equal length route fragments 204. In this schematic example, the route 200 is divided into 16 equal length route fragments. A first portion 206 of the route fragments 204 are grouped into at least one first route segment 206 (in this example, four first route segments are formed each of two route fragments 204). A second portion 208 of the route fragments 204 are grouped into at least one second route segment 208 (in this example, two second route segments are formed each of four route fragments 204). The number of route fragments 204 in each second portion 208 is greater than the number of route fragments 204 in each first portion 206 (i.e. in this example four fragments 204 in each second portion 208 compared with two fragments 204 in each first portion 206). The control system of FIG. 3a may be arranged to divide the route data into a plurality of route segments in such a way.

Another example "real world" grouping scheme is to form 16 unequal length segments from 50 route fragments. Segments 1-4 at the start of the route may each contain one fragment; segments 5-6 next along the route may each contain two fragments, segments 7-9 next along the route may each contain three fragments, segments 10-11 next along the route may each contain four fragments, and segments 12-16 at the end of the route may each contain five fragments, totalling 50 fragments. Thus there may be more than two lengths of segments present in the overall route.

The route segments 208 further from the start point of the route 202 represent a longer route distance than the route segments 206 closer to the start point of the route 202. In other words, the approximation is biased towards greater accuracy of route profile closer to the vehicle position (the start of the route) to allow calculation of more accurate and realistic metadata (e.g. energy requirements). If the vehicle battery is drained before the end of the full profile, data after the point of full battery drainage is not required or useful. By grouping the route fragments into segments which are smaller closer to the vehicle, greater accuracy of calculations may be performed in the more relevant location just in front of the vehicle.

When performing calculations to determine energy requirements for travelling along the route, the energy requirement for each of the route segments may be calculated (rather than an overall energy requirement for the whole route). From the energy requirements, it may be determined, for example, how far along the route an electric vehicle is able to travel before requiring battery re-charging. By segmenting the route as described such that the route segments closer to the start of the route are shorter than those further from the start of the route, more accurate energy calculations may be provided for the earlier route sections. If the vehicle is only able to travel a portion (e.g. 40%) of the distance along the route before the battery requires re-charging, then there is little merit, at the start of the journey, in expending computational resources to calculate the energy requirements of the vehicle for later in the route (e.g. after 40%, or another fraction, of the route has been travelled) because the vehicle energy parameters will change after re-charging en route anyway. In short, more accurate energy requirements calculations may be performed closer to the start of the route, and less accurate calculations may be performed further on in the route, since the later route portion may not be reached without altering the vehicle's energy parameters beforehand (e.g. by battery re-charging).

By segmenting the route data in this way, into unequal lengths, an improvement in the use of computational power is achieved by weighting the calculations to be more accurate (i.e. by being calculated for a shorter distance) closer to the start of the route. Thus more computational resources are directed to calculations closer to the route start, which is of greater importance since the later portions of the route may not be reached before changes in the vehicle energy parameters are made en route.

Further, determination of energy requirements and future energy status of the vehicle is achieved with greater accuracy. The calculations are performed for each segment of the route, and may therefore more accurately reflect the actual energy usage at each segment in the journey compared with, for example, taking a single average energy requirement for the while route journey. By segmenting the route using shorter route segments closer to the start of the journey, where energy requirements may be more variable than later in the journey (see FIGS. 8a-8b, 9a-9b and 10a-10b for further discussion), accuracy of calculated energy requirements may be further improved. That is, a smaller/finer granularity of route energy requirements may be used at the start, where energy requirements may be more variable than later in the journey, and a larger/coarser granularity of route energy requirements may be used later in the route, where energy requirements may be less variable than at the start of the journey. Calculation of energy requirements later in the route are less important at the start of the journey, and may be more important later in the journey when those segments are closer to the vehicle's current position (by which point the vehicle's energy information 302 may be different, e.g. due to battery re-charging or energy expenditure). Further, by breaking the overall route down into route segments, account may be taken for unexpected variations en route, such as traffic/stationary periods (e.g. traffic jams) and variable speeds (e.g. heavy traffic, temporary speed restrictions).

By improving the accuracy with which the range of a vehicle can be predicted and provided to a vehicle user/occupant, the user has greater confidence in the performance of the vehicle and the capabilities. This may impact the consumer uptake of electric vehicles, as increased user confidence in understanding the vehicle capabilities may increase the proportion of users using electric vehicles, thereby affecting the environmental impact of vehicle use.

Figure 3A:
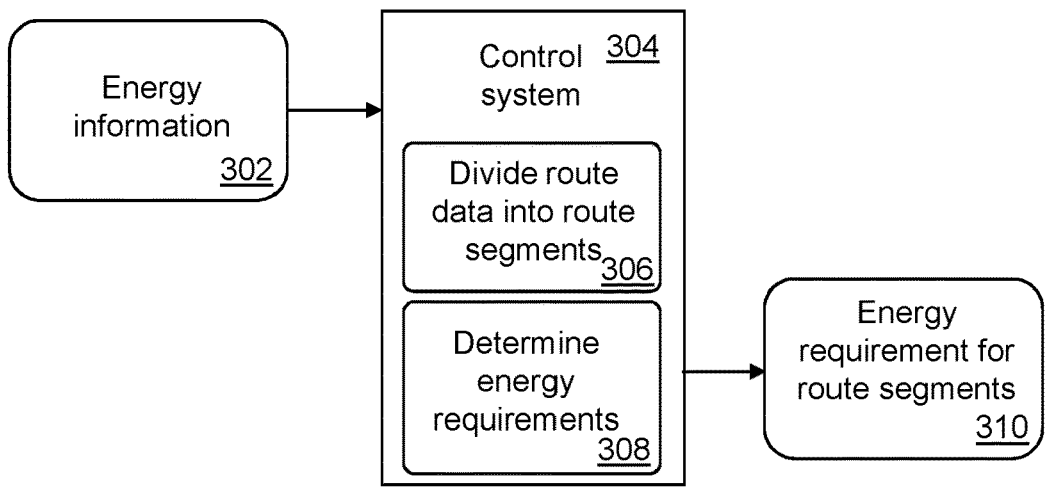
FIGS. 3a, 3b and 3c show example control systems according to examples disclosed herein.

FIG. 3a shows an example control system 304 for a vehicle according to examples disclosed herein. The control system 304 may be considered to be a navigation-type control system such as control system 104 of FIG. 1. The control system 304 comprises one or more controllers (see for example FIG. 4) and is arranged to receive energy information 302 for the vehicle. The energy information 302 may be provided by a second control system such as an energy storage control system 154 handling vehicle energy data. The control system 304 may be arranged to receive an energy parameter indicative of energy consumption or energy generation according to at least one route property. The energy parameter may comprise, for example, tractional energy required in a predetermined speed window; energy required to ascend a predetermined gradient; energy gained by descent of a predetermined gradient; and/or an amount of regenerative energy a battery of the vehicle can accept.

The control system 304 can divide route data 306 (for example stored at an integral or connected storage 110) into a plurality of route segments comprising a first route segment and a second route segment. The route data is indicative of a route between a first location (e.g. a planned starting point, a current vehicle position) and a second location (e.g. a planned end point, a planned stopping point). The route data may comprise information indicative of, for example, elevation gain along the route; elevation loss along the route; distance along the route; average speed of the route segments; traffic conditions along the route; weather conditions along the route; time at which a point of the route is planned to be reached; and speed of travel along the route.

Each route segment is indicative of a portion of the route. For example, a first route segment may represent the first 10% of a planned route. The first route segment is indicative of a length of a first portion of the route (for example, 2 km). The second route segment is indicative of a length of a second portion of the route (for example, 5 km). The first route segment precedes the second route segment along the route (i.e. it is closer to the first location). The length of the first portion of the route is smaller than the length of the second portion of the route. There may be plural first portions, plural second portions, and/or one or more further portions, dependent on how the route data is segmented. An example schematic route is discussed further in relation to FIG. 2.

The control system 304 can then determine an energy requirement 308 for each route segment in dependence on the energy information 302. The control system 304 may be arranged to calculate an energy required to move the vehicle along each route segment in dependence on a received energy parameter, such as a parameter indicative of energy consumption or energy generation according to at least one route property. For example, the control system 304 may be arranged to output a tractive energy required to move the vehicle along each route segment in dependence on energy parameters, such as parameters indicating energy required for the vehicle to climb a gradient. In some examples, the control system 304 may be arranged to output an energy required to move the vehicle along each route segment, wherein the energy required accounts for tractive energy and one or more ancillary energy requirements which also affect the available energy for powering the vehicle (for example, accounting for external/route factors such as current weather conditions, road surface type and vehicle loading, and/or accounting for vehicle factors such as power requirements of heated seats, air conditioning, entertainment systems, etc).

The tractive energy requirements may depend on the route (i.e. the length of the journey, route characteristics (e.g. gradients, the amount of ascent or descent per segment), and the time taken to traverse each route segment). Other ancillary factors relating to the route which may affect the energy requirements, and which may be accounted for in the future energy calculations include the average vehicle speed on the route segment, levels of traffic (quiet, busy), the presence of roadworks, route learning (i.e. learned historical characteristics of the route segment, from the user/vehicle and/or from one or more other users/vehicles), the time of day (e.g. driving at 11 pm may be less congested than driving at 5 pm), the day of week (e.g. the route may have less traffic on a Sunday than a Monday). One or more such route-dependent ancillary factors may be communicated to the control system 304 via "vehicle-to-everything" (V2X) (e.g. "vehicle-to-vehicle" (V2V), "vehicle-to-infrastructure" (V2I)) communication in some examples.

For example, the control system 354 may provide the control system 304 with a series of historically derived energy consumption (kWh/km) values for a range of vehicle speeds. The range of vehicle speeds may be provided because energy consumption varies non-linearly with vehicle speed. For example, it may require less energy to travel a distance of 1 km at 20 km/h than to travel the same distance at 50 km/h. The number of vehicle speeds provided (e.g. seven different vehicle speeds) may be selected to balance the amount of data transmitted with enough different vehicle speeds to allow for a sufficiently accurate calculation of energy consumption. The amount of energy gained/lost in descending/ascending by a unit height difference (e.g. one metre) may also be provided to the control system 304. The control system 304 may then use these consumption values to calculate the traction energy consumed per route fragment, and this information may then be summed to produce the total traction energy, time and distance for the whole route.

Certain other ancillary factors relating to the vehicle operation, rather than the route properties, may affect the energy requirements for the vehicle. These may also, in some examples, be accounted for in the future energy calculations. Such factors are discussed in more detail in relation to FIGS. 10a and 10b, and include features such as operation of vehicle ancillary systems, e.g. heating/cooling/air conditioning systems, entertainment systems, and electrically-operated mechanical systems (window opening/closing, wing mirror position adjustment).

In some examples, also the state of health (SoH) of the battery providing electrical power to power the vehicle may be taken into account. For example, a brand new battery may be able to provide 100 kWh at full charge, but a battery which has been used for several years may not be able to provide as much energy at full charge. Consequently the capability of the battery to satisfy a given energy requirement is dependent on the SoH. Similarly the calculation of a battery energy content is not simply determined by a state of charge of the battery, since battery energy content depends on the voltage at which the battery is operating, as well as the state of charge. These factors may all be accounted for in the control system, for example where the control system includes a Battery Energy Control Module (BECM) which communicates with the Vehicle Supervisory Controller (VSC).

Figure 10A:
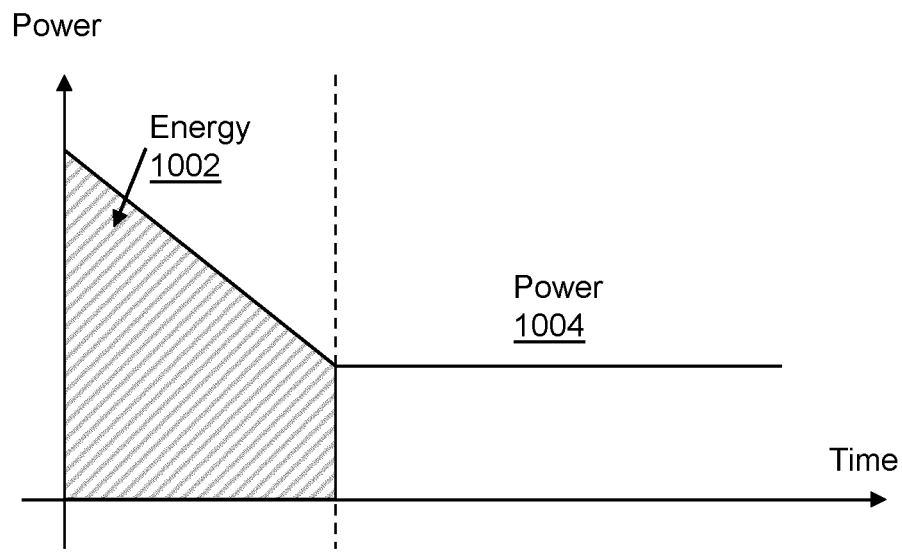
FIGS. 10a-10b illustrate time-dependent ancillary load variations which may be factored into a future energy status calculation in accordance with examples disclosed herein.
Figure 10B:
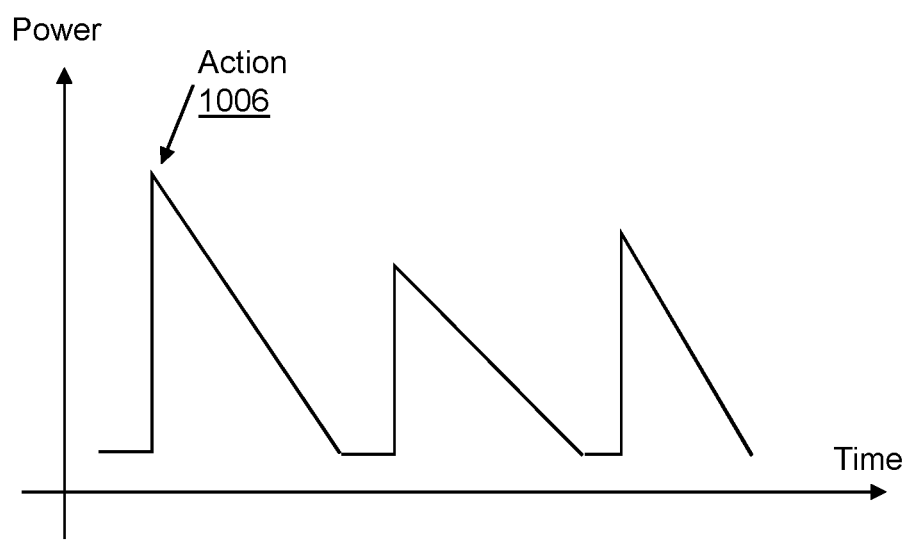

An energy prediction function dependent on such other, vehicle dependent, ancillary loads depends on factors such as, for example, the duration of the journey, the initial state of the vehicle, and the desired state of the vehicle. Various climate based ancillary loads (e.g. Heating, Ventilation and Air Conditioning (HVAC)) may provide the control system 354 with estimates of the amount of energy (kWh) required to transition the vehicle from the current state (e.g. current cabin temperature) to the desired state (desired cabin temperature) (i.e. 'pull-down' or 'pull-up' energy). Such HVAC systems, together with other vehicle systems (e.g. headlights, infotainment, heated front and rear windscreen, heated steering wheel, heated/cooled seats, etc.) may also provide the control system 354 with estimates of an amount of power (kW) required to maintain the desired state. This is illustrated in the examples of FIGS. 10a and 10b

Figure 3B:
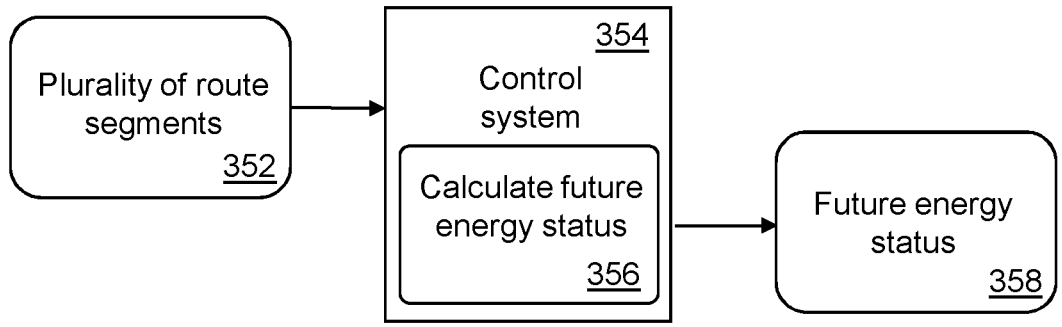

The control system 304 can then output the energy requirement 310 for the plurality of route segments. In some examples the energy requirement may be provided to a further control system such as an energy supply control system as illustrated in FIGS. 1 and 3b. In some examples the energy requirement may be output to a memory for storage and future retrieval. In some examples the energy requirement may be output to an output device for indication to a vehicle occupant or user, such as by a display screen or speaker.

In some examples, the control system 304 may divide route data 306 into a plurality of route segments as above and provide the route segments as output to a further control system which performs determination of energy requirements for each route segment. For example, the route segments may be passed to an energy supply control system, In some examples, the control system 304 may be arranged to determine a future energy status of the vehicle at the end of each of the route segments calculated in dependence on the route segments and an energy status of the vehicle. The future energy status may comprise an indication of a state of charge of an energy storage means (e.g. a battery, capacitor, or other energy storage and provision element) of the vehicle. This determination of the future energy status may comprise receipt of the future energy status as calculated at another control system (e.g. at the control system 154 of FIG. 1 or control system 354 of FIG. 3b). That is, a further control system 354 may calculate the future energy status dependent on the route segments determined at the control system 304 and an energy status of the vehicle (e.g. received energy information 302).

In some examples, the control system 304 may be arranged to identify, in dependence on the future energy status of the vehicle at the end of each of the received route segments, and map data, one or more charge points each indicating a location at which the vehicle can recharge an energy storage means. The control system 304 may be arranged output an indication of the identified one or more charge points with respect to the route, for example for display on a user display.

FIG. 3*b* shows an example control system 354 according to examples disclosed herein. The control system 354 may comprise an energy storage control system, for example, configured to manage energy related data for the vehicle such as battery information. An example of an energy storage control system includes a Battery Energy Control Module (BECM). The control system 354 may also comprise a Heating, Ventilation and Air Conditioning control module (HVAC). The benefits of using such specialist controllers is that some processing intensive operations are performed within these controllers (e.g. energy storage and state of charge), leaving a central supervisory vehicle controller to coordinate calculations with the navigation application system, with summary data being transmitted across the low bandwidth network connecting the controllers.

The control system 354 for a vehicle of FIG. 3*b* comprises one or more controllers (see for example FIG. 4), and is arranged to receive a plurality of route segments 352, for example, from the control system of FIG. 3*a*. Each route segment is indicative of a portion of route data representing a route between at least first and second locations. One or more first route segments of the plurality of route segments are indicative of a first length of the route, one or more second route segments of the plurality of route segments are indicative of a second length of the route, the one or more first route segments precede the one or more second route segments along the route and the first length is smaller than the second length.

The control system 354 is arranged to calculate 356, from the received route segments 352 and an energy status of a vehicle, a future energy status 358 of the vehicle at the end of the received route segments. The future energy status 358 may indicate a state of charge of an energy storage means of the vehicle (e.g. of a battery where the vehicle is an electric vehicle). The future energy status 358 may indicate a distance to a predetermined minimum state of charge of the energy storage means of the vehicle (e.g. 50 km may be travelled before a charge of 10% remains in the battery of an electric or hybrid vehicle). The future energy status 358 may indicate one or more other measures of energy relating to the vehicle at the end of the received route segments.

The control system 354 may be arranged to output the future energy status 358. For example the control system 354 may provide the future energy status 358 to a control system 304 described above. This may be performed directly between the control systems 304, 354, for example using a data bus. In some examples the future energy status 358 may be output to a third entity such as a cloud or remote server. In some examples, outputting the future energy status 358 may comprise providing the future energy status 358 to an output device, such as to a display screen e.g. a dashboard display of the vehicle or a display of a portable device in communication with the control system 354, such as a driver's mobile telephone.

Figure 5:
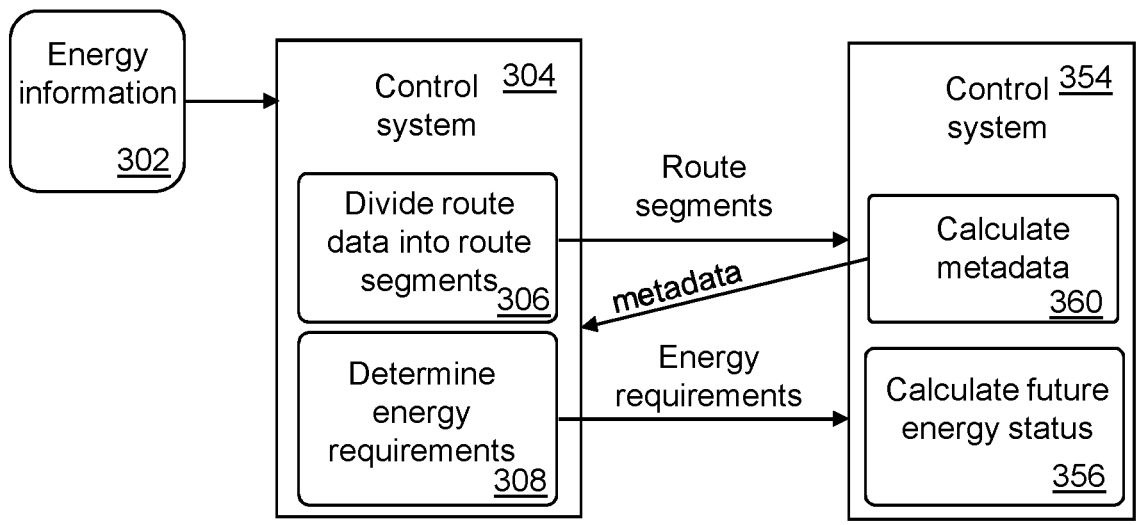
FIG. 5 shows an example control system according to examples disclosed herein.

The control system 354 may be arranged to output one or more energy parameters indicating energy consumption or energy generation according to a route property, for example to another control system such as control system 304. The control system 354 may be arranged to receive (for example, from the control system 304) an amount of tractive energy required to move the vehicle along each route segment calculated in dependence on the one or more provided energy parameters. Interaction between two such control systems 304, 354 is illustrated in relation to FIG. 5 depicting a system comprising multiple control systems (e.g. a navigation application system and an energy storage system).

The control system 354 may be arranged to receive data indicating one or more charge points with respect to the route (e.g. from a further control system 304). The one or more charge points may each indicate a location at which the vehicle can recharge a battery. The data indicating one or more charge points with respect to the route may be determined in dependence on the future energy status 358 of the vehicle and map data. The control system 354 may be arranged to then provide, to a vehicle output apparatus (e.g. a driver display or a speaker), an indication of the one or more charge point locations with respect to the route.

The control system 354 may be arranged to calculate the future energy status 358 of the vehicle at the end of the received route segments, in dependence on a) the amount of tractive energy required to move the vehicle along each route segment received from the further controller; and b) one or more of i) a predicted energy requirement to power ancillary operations of the vehicle and ii) motor losses of the vehicle. That is, ancillary power requirements may be accounted for in determining the future energy status 358 of the vehicle.

Figure 3C:
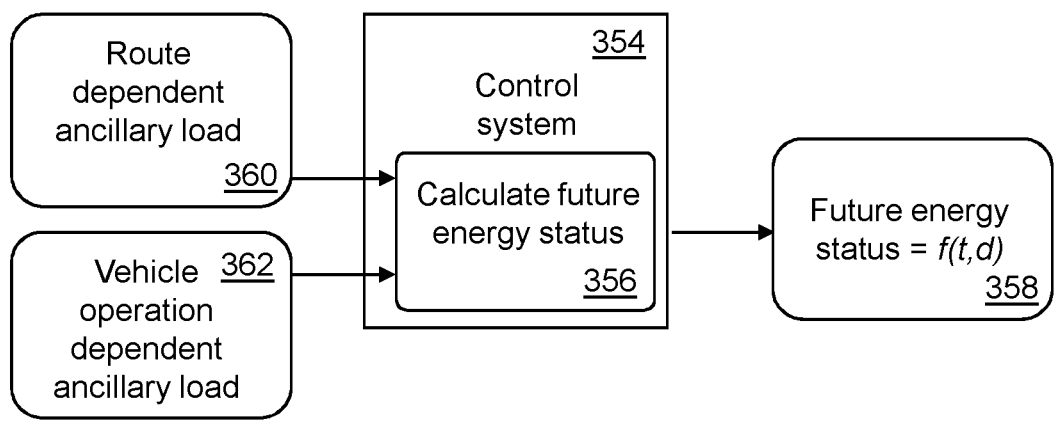

FIG. 3*c* illustrates that the ancillary load taken into account in future energy calculations may comprise one or more route dependent ancillary loads 360 (e.g. ascent/descent, traffic levels, weather, time/day), and one or more vehicle operation dependent ancillary loads 362 (e.g. heating/cooling system usage, in vehicle entertainment systems).

For example, 90% of the charge in a battery may be used to power the vehicle along the route and this energy consideration may be considered to be the tractive energy requirement plus route-dependent ancillary load requirements 360. Route dependent ancillary load requirements may also be considered to be distance dependent requirements as a distance is travelled along a route. For example, a portion of the 90% charge, as ancillary energy requirements, may go towards a higher-than-expected energy requirement to drive in snowy weather conditions, and/or to drive along a portion of the route which has a heavy traffic load, requiring the vehicle to travel slowly with an increased amount of time spent stationary compared with clear/low traffic driving conditions.

The remaining 10% of the charge in the battery may be required for vehicle-dependent ancillary energy purposes 362. For example, while the vehicle travels along the route, the power required to operate the headlights, screen heaters, air conditioning, and charge a portable electronic device connected to the vehicle, may be considered to be vehicle operation dependent ancillary loads 362 powered by the battery. For example, screen heaters may provide a significant electric load which varies non-linearly over time. A vehicle-dependent ancillary energy load may also be considered a time-based ancillary load because the vehicle operation takes place over a period of time (i.e. the power requirements to power the headlights depends on how long they are illuminated for; the power requirements to heat the driver's seat depends on how long the seat heater is switched on for). Vehicle-dependent (time-dependent) ancillary loads are discussed in more detail in relation to FIGS. 10*a*-10*b*. By separating out the calculations for route/distance dependent energy requirements, and vehicle operation/time dependent energy requirements, a more accurate estimate of the energy requirements for a journey can be performed.

By separating the calculation roles between a control system 104, 304 suited to handling route data (i.e. having large data set handling capability), and a control system 154, 354 suited to handling vehicle parameters and energy factors (i.e. having fast calculation capability), calculations may be performed at respective control systems having processing and memory capabilities appropriate to the calculations being made. By segmenting the route as described above, the calculations for route segments of the route may be made, allowing communication between the control systems over a twisted pair connection, thereby allowing for improved energy requirement determination using existing system configurations.

Looking back to FIG. 2, the route 200 may be divided into a number of route fragments 206 (in this example, 16) of a predetermined minimum segment length (e.g. 5 km). If the length of the route 200 (in this example, 16×5=80 km) is less than a predetermined length (e.g. a predetermined length of 90 km), one or more fragments 210 may be added superseding the one or more second route segments 208, as empty fragments.

As another practical example, a route may be divided into 50 equal fragments of a minimum 250 m in length (these example figures may be useful for real world cases). Therefore, for any route under 12.5 km in length (0.25 km×50 fragments), empty fragments may be included at the end of the route to allow for fragment grouping.

The future energy status of the vehicle at the end of each of the route segments 206, 208 may then be calculated in dependence on the route segments (e.g. the route profile indicating, for example, distance, gradient, road surface, speed limits) and an energy status of the vehicle (e.g. remaining battery power at the start of the route segment). One or more charge points may be identified and indicated to the driver based on the future energy status at the end of the route segments 206, 208. For example, if the expected battery power remaining is determined to be below a predetermined threshold (e.g. 10%) at a particular route segment end, then a charge point may be identified which is located before the end of the particular route segment so the vehicle may be charged before the remaining battery power reaches the 10% low power threshold. The identification of charge points may be done according to various factors. For example, a user may wish to ensure they reach a charging point before the battery charge is less than 10% remaining charge. As another example, a user may wish to ensure that charging en route is performed such that the battery charge upon reaching a destination is close to 0% charge (to avoid unnecessary charging time and expense en route, when the user is able to fully charge the vehicle battery as their leisure once arrived at the destination). The charging point data used to determine where the vehicle battery may be charged en route may comprise, for example, the power of the charging point (e.g. 70 kWh or 100 kWh), the speed of charge, user preferences, and other factors. Another factor which may be accounted for when determining charging points along a route is allowing travel of a minimum predetermined distance along the route before suggesting vehicle charging (e.g. to avoid the vehicle travelling for a short amount of time before suggesting topping up the charge).

Figure 4:
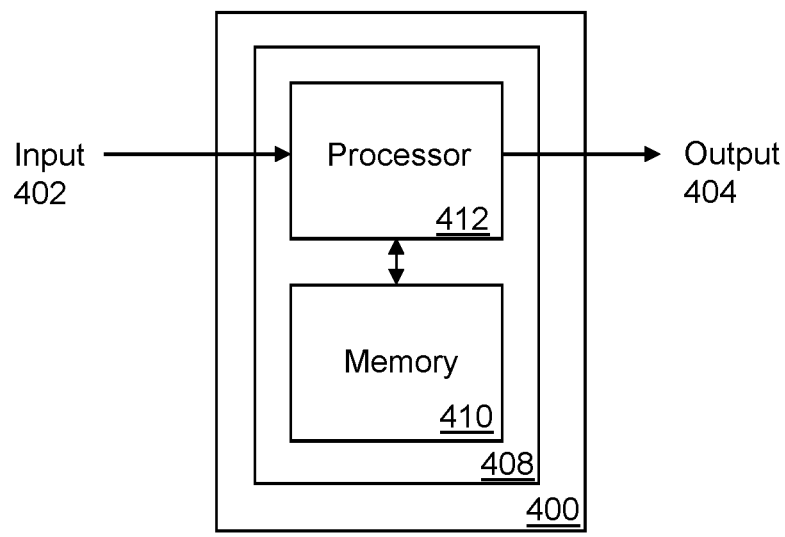
FIG. 4 shows an example of a simplified example of a control system such as may be adapted in accordance with an embodiment of the invention.

FIG. 4 shows an example of a simplified example of a control system such as may be adapted in accordance with an embodiment of the invention.

With reference to FIG. 4, there is illustrated a simplified example of a control system 400 (e.g. such as those illustrated in FIGS. 1 and 3a-3b) such as may be adapted to implement the methods of FIGS. 6 and/or 7 described below. The control system 400 comprises one or more controllers 408 which may be configured to receive energy information for a vehicle; divide route data, the route data indicative of a route between a first location and a second location, into a plurality of route segments comprising a first route segment and a second route segment; wherein: each route segment is indicative of a portion of the route, the first route segment is indicative of a length of a first portion of the route, the second route segment is indicative of a length of a second portion of the route, the first route segment precedes the second route segment along the route; and the length of the first portion of the route is smaller than the length of the second portion of the route; determine an energy requirement for each route segment in dependence on the energy information; and output the energy requirement for the plurality of route segments.

The one or more controllers 408 of the control system 400 may be configured to receive a plurality of route segments, each route segment indicative of a portion of route data representing a route between at least first and second locations, wherein one or more first route segments of the plurality of route segments are indicative of a first length of the route, one or more second route segments of the plurality of route segments are indicative of a second length of the route, the one or more first route segments precede the one or more second route segments along the route and the first length is smaller than the second length; control means arranged to calculate, from the received route segments and an energy status of a vehicle, a future energy status of the vehicle at the end of the received route segments; and output means arranged to output the future energy status.

It is to be understood that the or each controller 400 can comprise a control unit or computational device having one or more electronic processors (e.g., a microprocessor, a microcontroller, an application specific integrated circuit (ASIC), etc.), and may comprise a single control unit or computational device, or alternatively different functions of the or each controller 408 may be embodied in, or hosted in, different control units or computational devices. As used herein, the term "controller," "control unit," or "computational device" will be understood to include a single controller, control unit, or computational device, and a plurality of controllers, control units, or computational devices collectively operating to provide the required control functionality. A set of instructions could be provided which, when executed, cause the controller 408 to implement the control techniques described herein (including some or all of the functionality required for the method described herein). The set of instructions could be embedded in said one or more electronic processors 412 of the controller 408; or alternatively, the set of instructions could be provided as software to be executed in the controller 408. A first controller or control unit may be implemented in software run on one or more processors. One or more other controllers or control units may be implemented in software run on one or more processors, optionally the same one or more processors as the first controller or control unit. Other arrangements are also useful.

In the example illustrated in FIG. 4, the or each controller 408 comprises at least one electronic processor 412 having one or more electrical input(s) 402 for receiving one or more input signal(s)), for example, energy information 302 or route segments 352, and one or more electrical output(s) 404 for outputting one or more (output signal(s)), for example, energy requirement for route segments 310 or future energy status 358. The or each controller 408 further comprises at least one memory device 410 electrically coupled to the at least one electronic processor 412 and having instructions stored therein. The at least one electronic processor 412 is configured to access the at least one memory device 410 and execute the instructions thereon so as to perform methods disclosed herein.

The, or each, electronic processor 412 may comprise any suitable electronic processor (e.g., a microprocessor, a microcontroller, an ASIC, etc.) that is configured to execute electronic instructions. The, or each, electronic memory device 410 may comprise any suitable memory device and may store a variety of data, information, threshold value(s), lookup tables or other data structures, and/or instructions therein or thereon. In an embodiment, the memory device 410 has information and instructions for software, firmware, programs, algorithms, scripts, applications, etc. stored therein or thereon that may govern all or part of the methodology described herein. The processor, or each, electronic processor 412 may access the memory device 410 and execute and/or use that or those instructions and information to carry out or perform some or all of the functionality and methodology describe herein.

Figure 11:
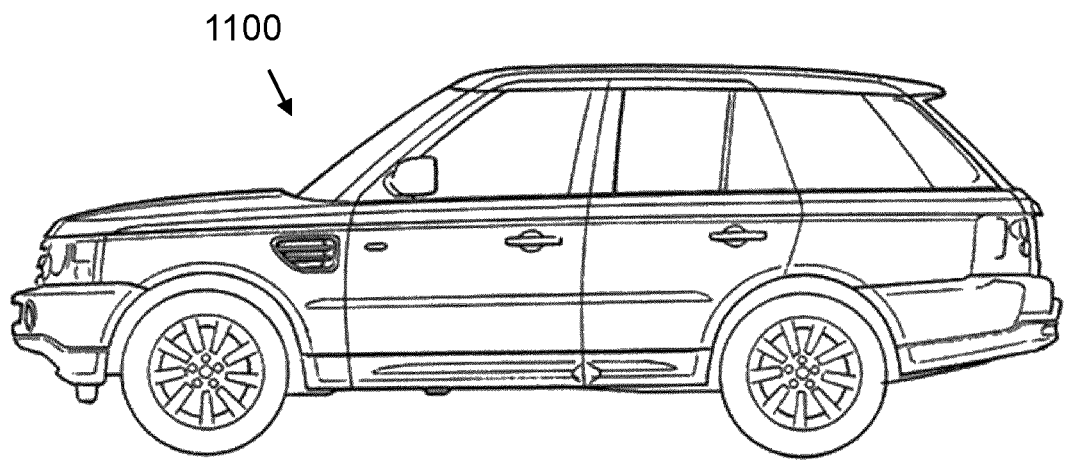
FIG. 11 shows a vehicle in accordance with examples disclosed herein.

The at least one memory device 410 may comprise a computer-readable storage medium such as that illustrated in FIG. 11 (e.g. a non-transitory, non-volatile or non-transient storage medium) that may comprise any mechanism for storing information in a form readable by a machine or electronic processors/computational devices, including, without limitation: a magnetic storage medium (e.g. floppy diskette); optical storage medium (e.g. CD-ROM); magneto optical storage medium; read only memory (ROM); random access memory (RAM); erasable programmable memory (e.g. EPROM ad EEPROM); flash memory; or electrical or other types of medium for storing such information/instructions.

Example controllers 408 have been described comprising at least one electronic processor 412 configured to execute electronic instructions stored within at least one memory device 410, which when executed causes the electronic processor(s) 412 to carry out the method as hereinbefore described. However, it is contemplated that the present invention is not limited to being implemented by way of programmable processing devices, and that at least some of, and in some embodiments all of, the functionality and or method steps of the present invention may equally be implemented by way of non-programmable hardware, such as by way of non-programmable ASIC, Boolean logic circuitry, etc.

FIG. 5 shows an example control system 300 according to examples disclosed herein. The illustrated control system 300 combines controls systems 304, 354 as described in relation to FIGS. 3a and 3b. For example, energy information 302 for the vehicle may be received by the first control system 304 which divides route data 306 into a plurality of route segments. The route segments 306 may be outputted by the first control system 304 to the second control system 354 which receives the plurality of route segments 306.

The second control system 354 may calculate and output one or more energy parameters (i.e. metadata), for example indicating energy consumption or energy generation according to a route property. The calculated metadata 360 may be output by the second control system 354 and received by the first control system 304. Using this received energy information metadata 360, the first control system 304 may determine an energy requirement 308 for each route segment in dependence on the energy information metadata 360 and output the energy requirement for the plurality of route segments. The energy requirements may be received by the second control system 354; for example, an amount of tractive energy required to move the vehicle along each route segment. Using the received energy requirements the second control system 354 may calculate a future energy status 356 of the vehicle at the end of the received route segments; and output the future energy status, for example to the first control system for further calculations (e.g. to identify one or more upcoming charge points) or to an output device such as a display screen for outputting the future energy status to a vehicle occupant.

By providing the segmented route from a control system 304 configured to large data file handling but not necessarily high processing capability, to a control system 354 configured for calculations relating to vehicle energy parameters, distance and state of charge calculations are performed at the control system arranged to perform such calculations without requiring that control system to handle large data files (e.g. eHorizon data). Thus, more accurate energy requirement calculations may be performed over existing low bandwidth communication channels, as a control system configured for higher processing requirement calculations, with improved accuracy compared to systems which do not segment or approximate the route data as discussed herein.

Figure 6:
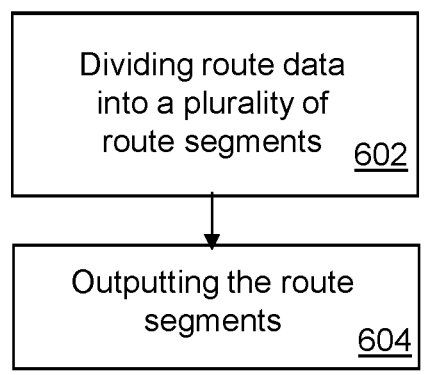
FIGS. 6 and 7 show example methods according to examples disclosed herein.
Figure 7:
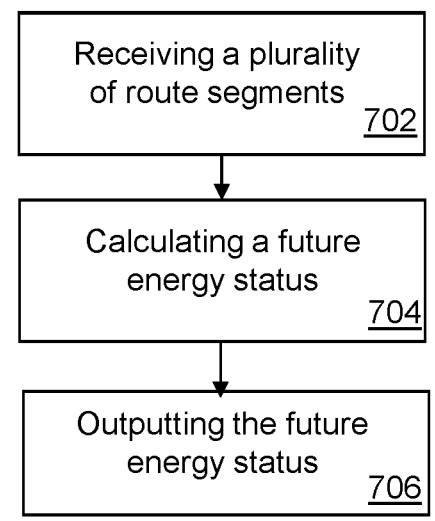

FIGS. 6 and 7 show example methods according to examples disclosed herein. FIG. 6 illustrates a method 600 comprising dividing route data indicative of a route between at least first and second locations into a plurality of route segments 602, and outputting the route segments 604. The method may be performed by a first control system 104, 304 for example. FIG. 7 illustrates a method comprising receiving a plurality of route segments 702; calculating, from the received route segments and an energy status of a vehicle, a future energy status 704 of the vehicle at the end of the received route segments; and outputting the future energy status 706.

Figure 8A:
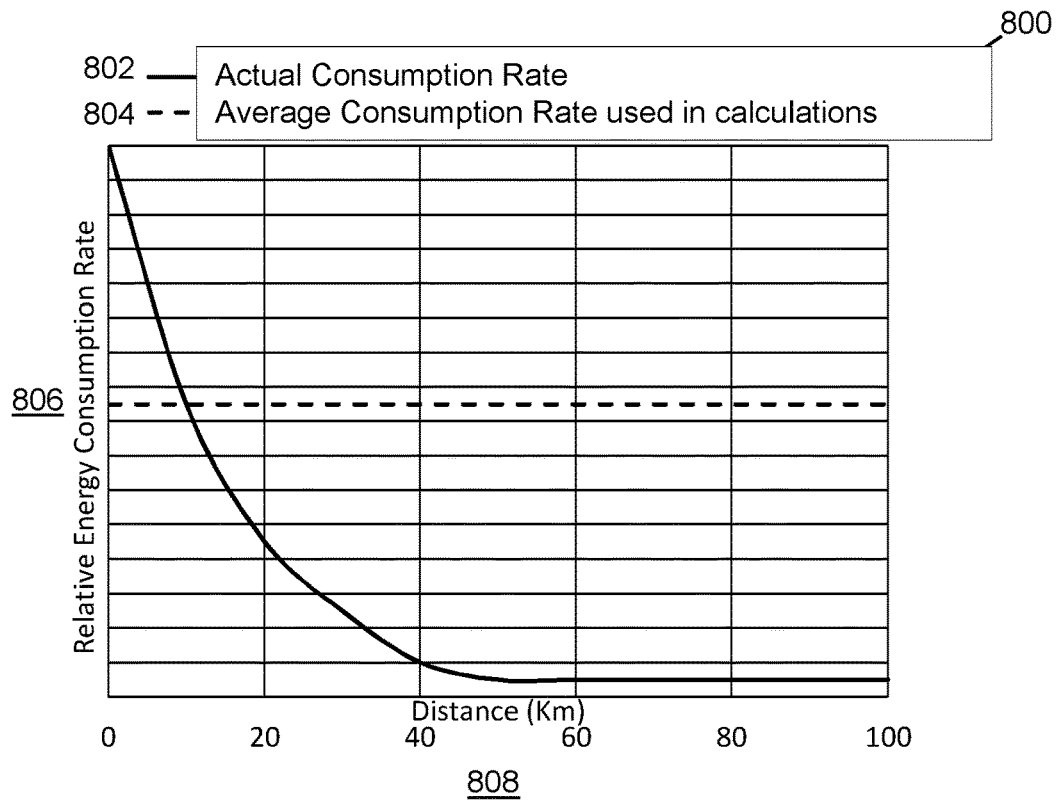
FIGS. 8a-8b show an illustrative example of calculated energy consumption compared with actual energy use.
Figure 8B:
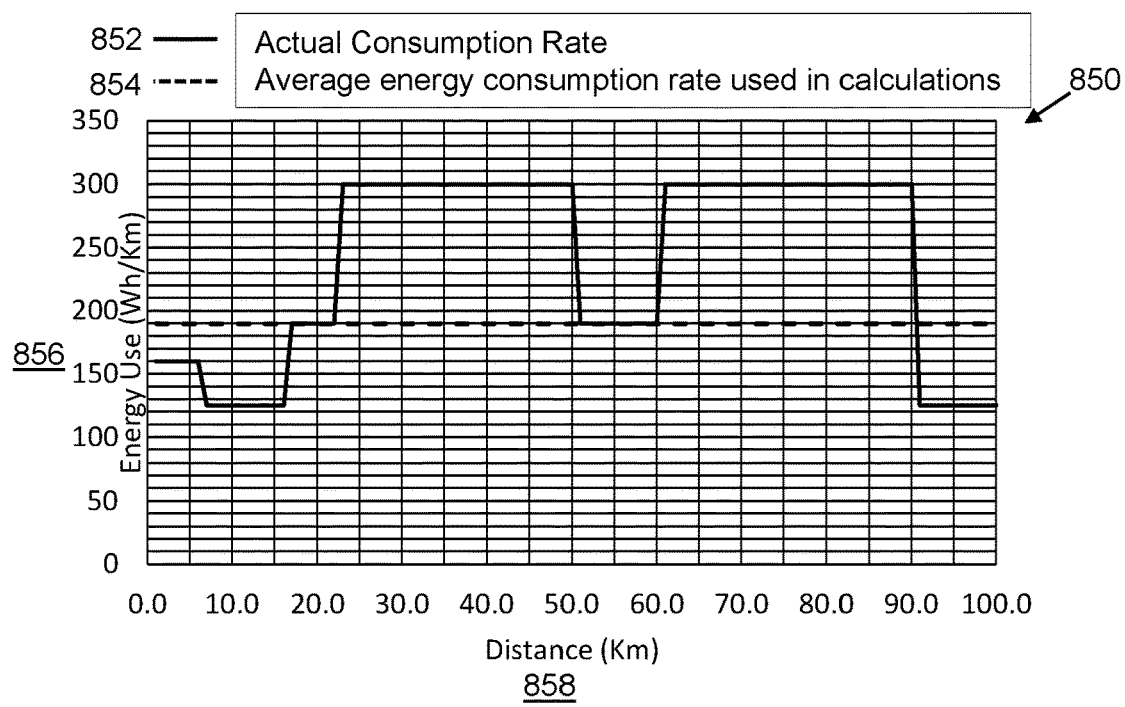

FIGS. 8a-8b show an illustrative example of average energy consumption 804 over a range distance of 100 km compared with actual energy use 802 over the same distance. In FIG. 8a, the energy consumption rate 806 is plotted over a route distance 808 of 100 km. The actual energy consumption rate 802 varies over the distance, and is illustrated as a curve, initially beginning at a high rate and falling with distance and gradually levelling off as a near constant low energy consumption rate at about 50 km. However, if the route is not segmented as described above, calculations using an energy consumption rate (e.g. to calculate an expected State of Charge after 100 km) use a single energy consumption value determined to be an average of the actual consumption rate for the whole distance, as indicated by the straight line 802 at a medium level energy consumption from 0 km to 100 km.

FIG. 8b shows how using the same average energy consumption value 854 across the whole route distance 858 leads to errors in determination of the calculated energy use 856 (and therefore errors in relation calculations of, for example, remaining state of charge of a battery of the vehicle). The real energy use 852 over the route 858 varies being higher in some locations (between around 22 km and 50 km and between around 60 km and 90 km, and lower in other locations (between 0 km and 22 km, between 50 km and 60 km, and between 90 km and 100 km). Thus inaccuracies are introduced by assuming the same rate of energy use over the entire route profile.

Figure 9A:
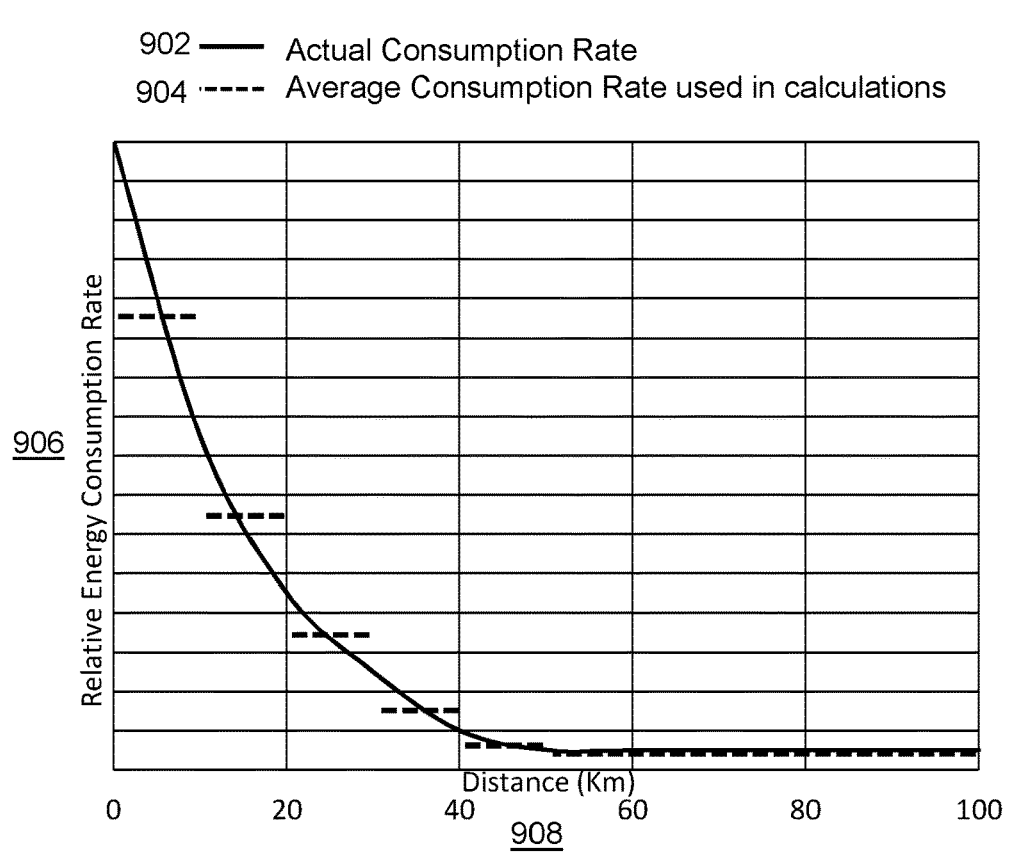
FIGS. 9a-9b show an illustrative example of calculated energy consumption compared with actual energy use according to examples disclosed herein.
Figure 9B:
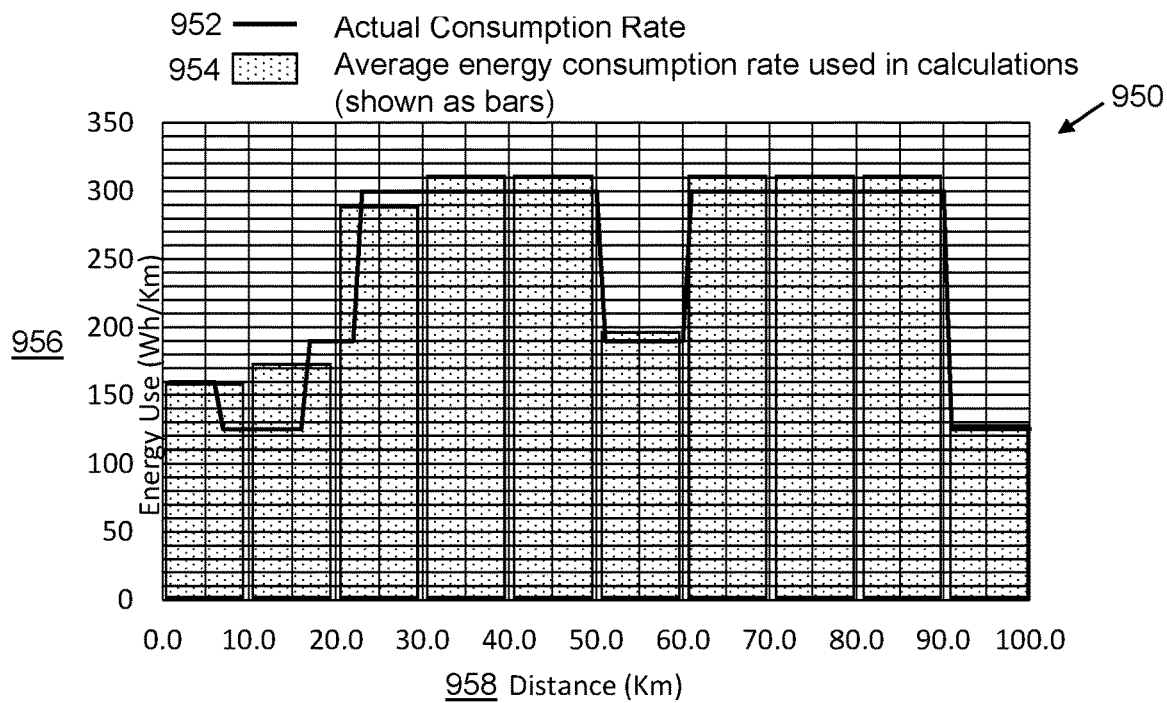

FIGS. 9a-9b show an illustrative example of calculated energy consumption over the range distance of 100 km compared with actual energy use according to examples disclosed herein. In FIG. 9a, as in FIG. 8a, the energy consumption rate 906 is plotted over a route distance 908 of 100 km. The actual energy consumption rate 902 varies over the distance as before. By splitting the route into segments as described above, an average consumption rate 904 for each route segment may be taken. In this example, there are five first route segments each of 10 km distance between 0 km and 50 km, and a second longer route segment of 50 km distance between 50 km and 100 km. By segmenting the route, average energy consumptions 904 much closer to the actual energy consumption 902 are obtained for each segment, and can be used in energy consumption rate based calculations (e.g. to calculate an expected State of Charge after 100 km).

FIG. 9b shows how using the segmented average energy consumption values 954 across the whole route distance 958 lead to a much more accurate representation of the actual energy use 952, thereby reducing errors in determination of the calculated energy use 956 compared to the approach illustrated in FIGS. 8a and 8b. The real energy use 952 over the route 958 varies being higher in some locations, and lower in other locations as before. The calculated energy use bars 954, indicating the calculated energy use per route segment, much more accurately reflect the real energy use 952. Thus inaccuracies are much reduced compared with the method illustrated in FIGS. 8a-8b taking a single average energy use estimation across the whole range.

FIGS. 10a and 10b illustrate energy requirements for vehicle-dependent (time-dependent) ancillary loads which may be factored into the future energy status calculations as discussed in relation to FIG. 3c. FIG. 10a illustrates a variation in the battery power requirements of vehicle systems such as HVAC systems, which require an initial energy input 1002 to achieve a desired state, followed by a "maintenance" energy input to provide power 1004 to maintain the desired state, once that state is achieved. For example, to defrost a windscreen using a heated windscreen function, an initial supply of energy 1002 is required to defrost the windscreen, and a "maintenance" energy supply 1004 is required thereafter to prevent it re-freezing.

FIG. 10b illustrates a variation in the battery power requirements of vehicle systems such as infotainment systems, which require an energy input to action a user input (e.g. button press) but do not require energy input to maintain a desired state. When an action is made (e.g. a button is pressed) an initial energy input 1006 is required to carry out the action (e.g. play music through the radio, switch on the heated seats) but a constant input of energy 1004 is not required to maintain the state of the activated function (although energy "boosts" may be later supplied to top up the energy supplied to maintain the function).

To estimate the time-dependent ancillary energy requirements for a journey along a route, historical ancillary energy requirements may be used to estimate the requirements for a future journey. For example, previous energy use for e.g. powering the air conditioning in similar weather conditions, in a similar location, and/or for a particular user, may be used to estimate the requirements to power the air conditioning for a future journey.

FIG. 11 shows a vehicle 1100 in accordance with examples disclosed herein, for example, comprising any control system described herein or configured to perform any method disclosed herein.

Figure 12:
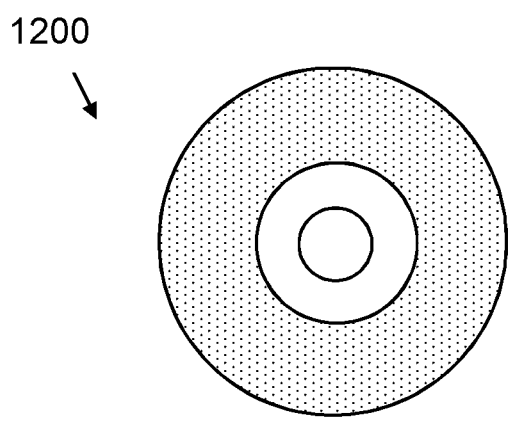
FIG. 12 shows a computer readable medium according to examples disclosed herein.

FIG. 12 shows a computer readable medium 1200 according to examples disclosed herein, which is, when executed, arranged to perform any method described herein. The computer readable medium 1200 may be a non-transitory, computer-readable storage medium storing instructions thereon that, when executed by one or more electronic processors, causes the one or more electronic processors to carry out any method disclosed herein.

It will be appreciated that various changes and modifications can be made to the present invention without departing from the scope of the present application.

The invention claimed is:

1. A control system for a vehicle, the control system comprising one or more controllers, the control system arranged to:
    receive energy information for the vehicle;
    divide route data, the route data indicative of a route between a first location and a second location, into a plurality of route segments comprising a first route segment and a second route segment;
    wherein:
        each route segment is indicative of a portion of the route,
        the first route segment is indicative of a length of a first portion of the route,
        the second route segment is indicative of a length of a second portion of the route,
        the first route segment precedes the second route segment along the route; and
        the length of the first portion of the route is smaller than the length of the second portion of the route;
    determine an energy requirement for each route segment in dependence on the energy information; and
    output the energy requirement for the plurality of route segments,
    wherein the control system is arranged to divide the route data into the plurality of route segments by:
        dividing the route data into a predetermined number of equal length route fragments of a predetermined minimum length;
        grouping a first portion of the plurality of route fragments into one or more first route segments; and
        grouping a second portion of the plurality of route fragments into one or more second route segments,
    wherein the number of route fragments in the second portion is greater than the number of route fragments in the first portion, and
    wherein the control system is further arranged to, if the length of the route is less than a predetermined length, include one or more empty fragments after said one or more second route segments.

2. The control system of claim 1, further arranged to:
    receive an energy parameter indicative of energy consumption or energy generation according to at least one route property; and
    calculate an energy required to move the vehicle along each route segment in dependence on the received energy parameter.

3. The control system of claim 2, wherein the energy parameter comprises:
    tractional energy required in a predetermined speed window;
    energy required to ascend a predetermined gradient;
    energy gained by descent of a predetermined gradient; and
    an amount of regenerative energy a battery of the vehicle can accept.

4. The control system of claim 2, further arranged to output a tractive energy required to move the vehicle along each route segment.

5. The control system of claim 2, further arranged to calculate a tractive energy required to move the vehicle along each route segment in dependence on the received energy parameter.

6. The control system of claim 1, further arranged to determine a future energy status of the vehicle at an end of each of the plurality of route segments calculated in dependence on the route segments and an energy status of the vehicle, the future energy status comprising an indication of a state of charge of an energy storage means of the vehicle.

7. The control system of claim 6, further arranged to:
identify, in dependence on the future energy status of the vehicle at the end of each of the plurality of route segments, and map data, one or more charge points each indicating a location at which the vehicle can recharge an energy storage means; and
output an indication of the identified one or more charge points with respect to the route.

8. A vehicle comprising the control system of claim 1.

9. The control system of claim 1, wherein the one or more controllers collectively comprise:
at least one electronic processor having an electrical input for receiving the energy information for the vehicle; and
at least one memory device electrically coupled to the at least one electronic processor and having instructions stored therein;
wherein the at least one electronic processor is arranged to access the at least one memory device and execute the instructions thereon so as to:
divide the route data into the plurality of route segments comprising the first route segment and the second route segment;
determine the energy requirement for each route segment in dependence on the energy information; and
output the energy requirement for the plurality of route segments.

10. The control system of claim 1, further arranged to, if the length of the route is less than a predetermined length, assign a fragment superseding the second route segment as an empty fragment.

11. The control system of claim 1, wherein the route data comprises information indicative of at least one from a group comprising:
elevation gain along the route;
elevation loss along the route;
distance along the route;
average speed of the first and second route segments;
traffic conditions along the route;
weather conditions along the route;
time at which a point of the route is planned to be reached; and
speed of travel along the route.

12. A method, comprising:
dividing route data indicative of a route between at least first and second locations into a plurality of route segments, wherein each of the plurality of route segments is indicative of a portion of the route, one or more first route segments of the plurality of route segments are indicative of a first length of the route, one or more second route segments of the plurality of route segments are indicative of a second length of the route, the one or more first route segments precede the one or more second route segments along the route and the first length is smaller than the second length; and
outputting the plurality of route segments,
wherein dividing the route data into the plurality of route segments includes:
dividing the route data into a predetermined number of equal length route fragments of a predetermined minimum length;
grouping a first portion of the plurality of route fragments into one or more first route segments; and
grouping a second portion of the plurality of route fragments into one or more second route segments,
wherein the number of route fragments in the second portion is greater than the number of route fragments in the first portion, and
wherein the control system is further arranged to, if the length of the route is less than a predetermined length, include one or more empty fragments after said one or more second route segments.

13. The method of claim 12, wherein dividing the route data into said plurality of route segments comprises:
dividing the route data into a predetermined number of equal length route fragments of a predetermined minimum length;
grouping a first portion of the plurality of route fragments into said one or more first route segments; and
grouping a second portion of the plurality of route fragments into said one or more second route segments;
wherein a number of route fragments in the second portion is greater than a number of route fragments in the first portion, and
if a length of the route is less than a predetermined length, including one or more empty fragments after the one or more second route segments.

14. A non-transitory, computer-readable storage medium storing instructions thereon that, when executed by one or more electronic processors, causes the one or more electronic processors to carry out a method according to claim 12.

* * * * *